United States Patent [19]

Bhate et al.

[11] Patent Number: 4,827,163
[45] Date of Patent: May 2, 1989

[54] MONOCOIL RECIPROCATING PERMANENT MAGNET ELECTRIC MACHINE WITH SELF-CENTERING FORCE

[75] Inventors: Suresh K. Bhate, Schenectady; Nicholas G. Vitale, Albany, both of N.Y.

[73] Assignee: Mechanical Technology Incorporated, Latham, N.Y.

[21] Appl. No.: 835,957

[22] Filed: Mar. 4, 1986

[51] Int. Cl.<sup>4</sup> ............................................. H02K 33/00
[52] U.S. Cl. ........................................ 310/15; 310/13; 310/14
[58] Field of Search ................... 310/12, 14, 15, 30, 310/13; 290/1 R

[56] References Cited

U.S. PATENT DOCUMENTS

| | | | |
|---|---|---|---|
| 4,346,318 | 8/1982 | Shtrikman | 310/30 X |
| 4,349,757 | 9/1982 | Bhate | 310/15 |
| 4,389,849 | 6/1983 | Gasser et al. | 310/15 X |
| 4,454,426 | 6/1984 | Benson | 290/1 R |
| 4,532,431 | 7/1985 | Iliev et al. | 310/15 X |
| 4,602,174 | 7/1986 | Redlich | 310/15 |
| 4,623,808 | 11/1986 | Beale et al. | 310/15 |

Primary Examiner—R. Skudy
Attorney, Agent, or Firm—Joseph V. Claeys; Joseph C. Sullivan

[57] ABSTRACT

A linear reciprocating machine has a tubular outer stator housing a coil, a plunger and an inner stator. The plunger has four axially spaced rings of radially magnetized permanent magnets which cooperate two at a time with the stator to complete first or second opposite magnetic paths. The four rings of magnets and the stators are arranged so that the stroke of the plunger is independent of the axial length of the coil.

7 Claims, 8 Drawing Sheets

MONOCOIL RECIPROCATING PERMANENT MAGNET ELECTRIC MACHINE WITH SELF-CENTERING FORCE

The invention described herein was made in the performance of work under NASA Contract No. NAS3-23883 and is subject to the provisions of Section 305 of the National Aeronautics and Space Act of 1958 (72 Stat. 435; 42 U.S.C. 2457).

BACKGROUND OF THE INVENTION

1. Field of Invention

This invention pertains to a reciprocating linear machine for conversion of electromagnetic energy into reciprocating motion of a member and vice versa by utilizing a coil having length which is independent of the stroke of the member.

2. Description of the Prior Art

Linear electromagnetic machines are known which comprise a stator having a plurality of axially spaced coils for generating magnetic circuits and a plunger reciprocating within the stator. Typical examples of such machines are found in U.S. Pat. Nos. 4,349,757 to S. K. Bhate and 4,454,426 to Benson.

However, an important limitation of the prior art configuration was that the coils were limited axially to the length of the plunger stroke. Therefore the number of turns and/or the size of the coil wire was similarly limited thereby limiting the total amount of power per slot that could be transferred by the machine. Accordingly, for a high power machine multiple coils were required causing the axial length of the machine to be integer multiples of the basic building block.

A further disadvantage of the prior art linear electromagnetic machines, and more particularly the machines used as motors was that in the absence of an excitation current, the plunger was urged by the magnetic field of the permanent magnet of the system towards one of the extreme ends of its travel. In other words, in prior art configurations in the absence of excitation currents, a magnetic force urged the plunger toward one or the other extreme ends of travel as stable points. This disadvantage of the prior art is overcome in the present invention by the provision of magnet rings which protrude beyond the magnetic circuit formed by the inner and outer stators. This arrangement results in a force on the plunger in the absence of current in the coil, to place the plunger symmetrically with respect to the stators. Thus, if the plunger is displaced from this symmetrical position, a centering force is exerted on the plunger to bring it back to the central position.

OBJECTIVES AND SUMMARY OF THE INVENTION

A principal objective of the present invention is to provide a linear reciprocating machine with a coil having an axial dimension which is independently of the stroke of the machine plunger, and therefore, may be optimized for maximum power transfer.

Another objective of the invention is to provide a machine with a self-centering plunger upon discontinuance of power.

Other objectives and advantages of the invention shall become apparent from the following description of the invention. A linear reciprocating machine constructed in accordance with this invention comprises an outer stator with a housing made of a material with high magnetic permeability and a toroidal coil, an inner stator also made of a material with high permeability and a plunger with several annular magnets with radial magnetization mounted for reciprocation in the space between the outer and inner stators. The outer stator is provided with annular gap forming means which are axially coextensive with the annular magnets, the inner and outer stators being constructed and arranged to form a magnetic circuit with some of said magnets and with said outer stator.

BRIEF DESCRIPTION OF THE DRAWINGS

FIG. 7 shows the centering force on the plunger as a function of its axial displacement;

DETAILED DESCRIPTION OF THE INVENTION

Figure 1:
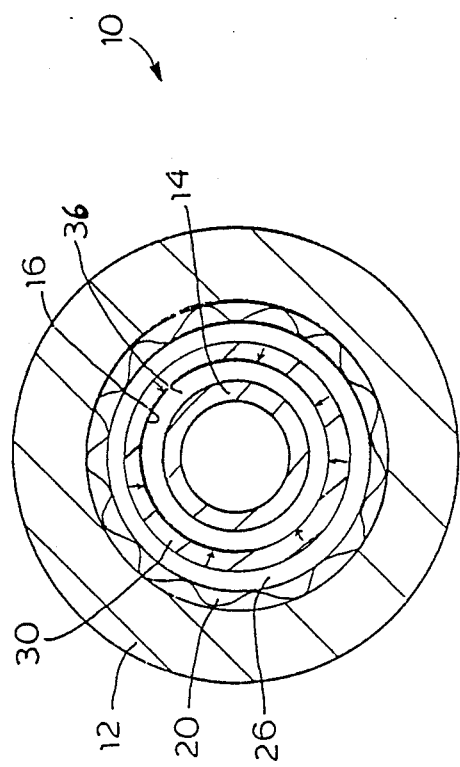
FIG. 1 shows a cross-sectional view of the machine constructed in accordance with this invention.
Figure 2:
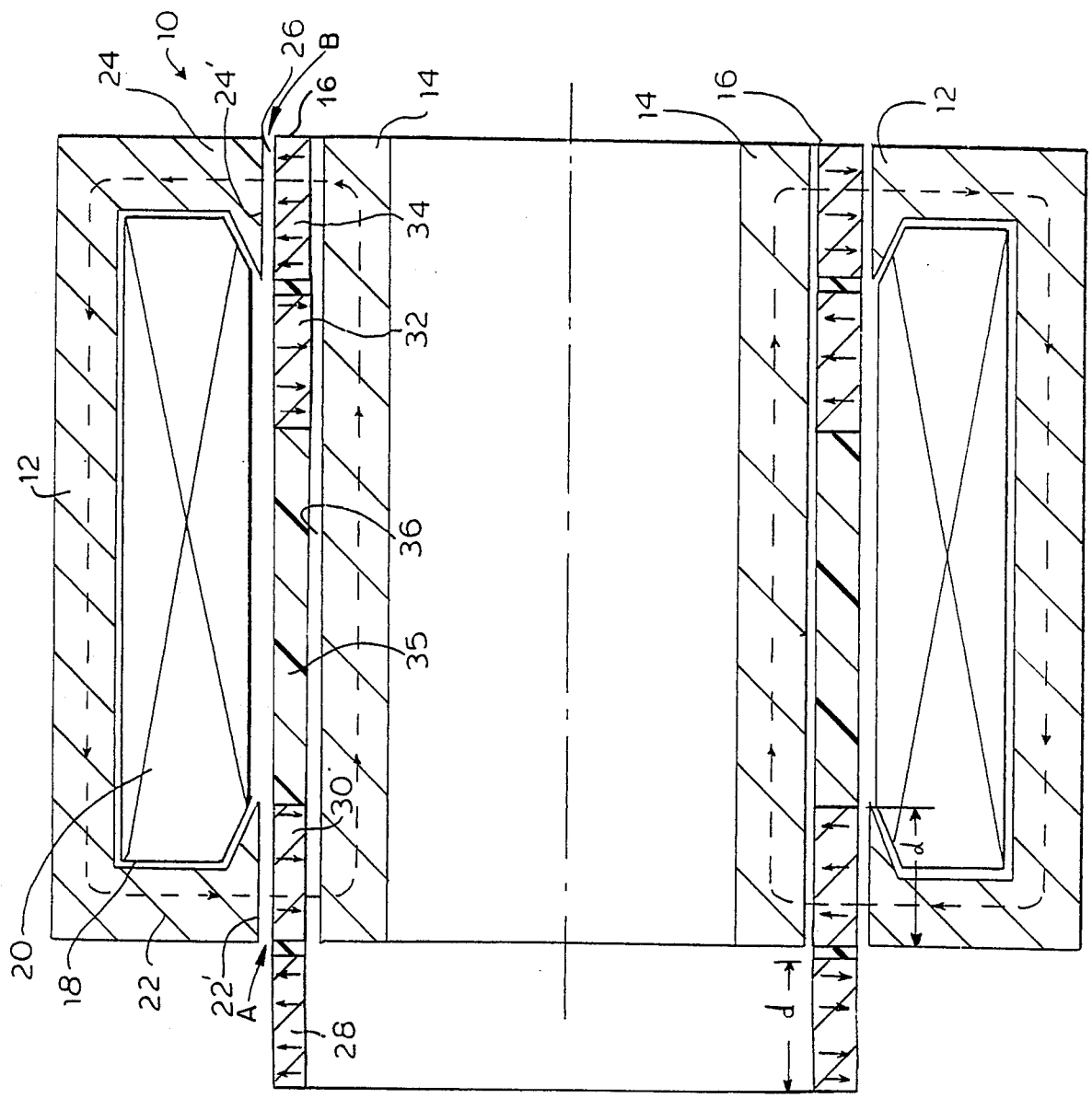
FIG. 2 shows a schematic side sectional view of a machine constructed in accordance with this invention with the plunger in a first extreme position.

Referring now to FIGS. 1 and 2, a linear reciprocating machine 10 comprises outer, hollow stator 12, an inner stator 14 and a hollow plunger 16 disposed therebetween. The stators and the plunger are constructed and arranged so that the plunger may be moved axially in a reciprocating motion with respect to the stators or vice versa. The stators are made of a material having very high magnetic permeability and low reluctance such as magnetic steel. In order to eliminate circumferential eddy currents, the stators are formed of radial laminations.

The outer stator 12 is made up from radial laminations stacked in such a manner as to form a cylindrical body with an annular cavity 18 opening inward for housing a single toroidal coil 20. The laminations are C-shaped with extending legs or end portions 22 and 24 and a wide opening which forms the cavity 18. The axial length of the lamination opening is not constrained by the stroke length of the machine as in prior art machines, but can be made as long as is desired to install a coil of any required axial length. The width of the lamination is determined by the amount of flux it has to carry. When the laminations are stacked to form the outer stator 12, the tips or pole pieces 22' and 24' of the C-shaped laminations form a pair of pole pieces each having an axial length "d" which is equal to or slightly greater than the maximum stroke desired.

Plunger 16 comprises four ring magnets 28, 30, 32, 34 magnetized radially. Spaces 26, 36 separate the plunger 16 from outer and inner stators, respectively. Importantly, the outer or end magnets are magnetized in a first direction, while the inner magnets are magnetized in an opposite direction. The axial length of each magnet 28, 30, 32, 34 is approximately equal to the dimension d of the stator end portions 22, 24. The stator end portions 22 and 24 provide respective air gaps with inner stator 14. These permanent magnets are preferably made of a material having high magnetic strength such as samarium cobalt. Since such materials are usually fairly weak structurally and mechanically, the magnets are preferably embedded in a suitable mounting member 35 made of a non-magnetic material.

Ideally, these ring magnets 28, 30, 32, and 34 should be magnetized radially. Alternatively, radial orientation can be approximated by using a large number of magnet segments of rectangular shape arranged to form a ring with approximately radial orientation. Various configurations for structurally forming such rings and holding them at appropriate axial locations with respect to each other may be employed. Also, since the mass of the reciprocating plunger should be kept to a minimum in order to minimize the inertial forces during reciprocating movement, the arrangement should aim for high structural integrity with minimum mass.

Figure 8:
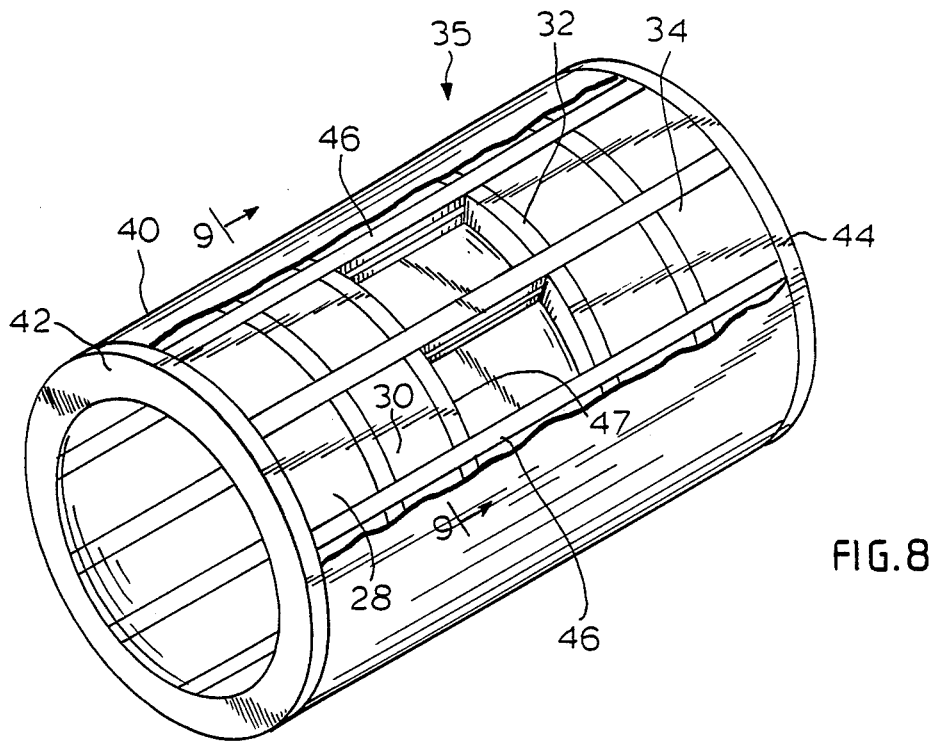
FIG. 8 shows an isometric view of the stator of the machine of FIGS. 1 and 2.
Figure 9:
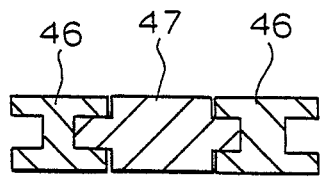
FIG. 9 shows a partial sectional view taken along line 9—9 in FIG. 8.

In FIG. 8 there is shown an arrangement which achieves the desired objectives. As shown, the mounting member 35 includes an open cage-like unit 40 of suitable non-magnetic material. The unit 40 includes a pair of end members 42 and 44 that are cojoined by a plurality of axially extending I-shaped members 46. The I-shaped members are circumferentially spaced about the outer periphery of the circular end members 42 and 44. A plurality of generally rectangular permanent magnet segments 47 are suitably disposed near the ends of the I-shaped members 46 to generate the required axially-spaced apart ring magnets 28, 30, 32 and 34 as shown.

The explanation of the machine working as a force actuator, requires a recourse to the technique of energy gradient or what is customarily known as the "principle of virtual displacement". In the application of this technique, changes in the energy associated with the overall system are obtained as the plunger undergoes an infinitesimal displacement. The force exerted on the surrounding is then obtained as the rate of change of work component of the total energy with respect to the displacement. While such an approach is necessary to obtain quantitative information, it is rather involved to obtain an appreciation of the working of the machine as a motor.

Perhaps the simplest way to gain such appreciation is to recognize that an electro-magnetic device such as the one under consideration, is merely an energy conversion device. Thus, it can work as a motor, if electrical energy is inputted, converting it to mechanical form and it can work as an alternator, if mechanical energy is inputted converting it to electrical form. It so happens, that in some instances one of the modes of operation is much more readily described and understood. The explanation of the operation of the machine of this invention as an alternator is very straightforward requiring application of only Faraday's Law of Induction. For example, when the permanent magnet plunger 16 reciprocates relative to the stators 12 and 14, the flux linking the coil changes. This change of flux causes a voltage to be induced in the coil. From Faraday's Law of Induction, the magnitude of the induced voltage is equal to the time rate of change of flux linkages of the coil.

This operation can be seen in more detail with the help of FIGS. 2 through 5.

Figure 3:
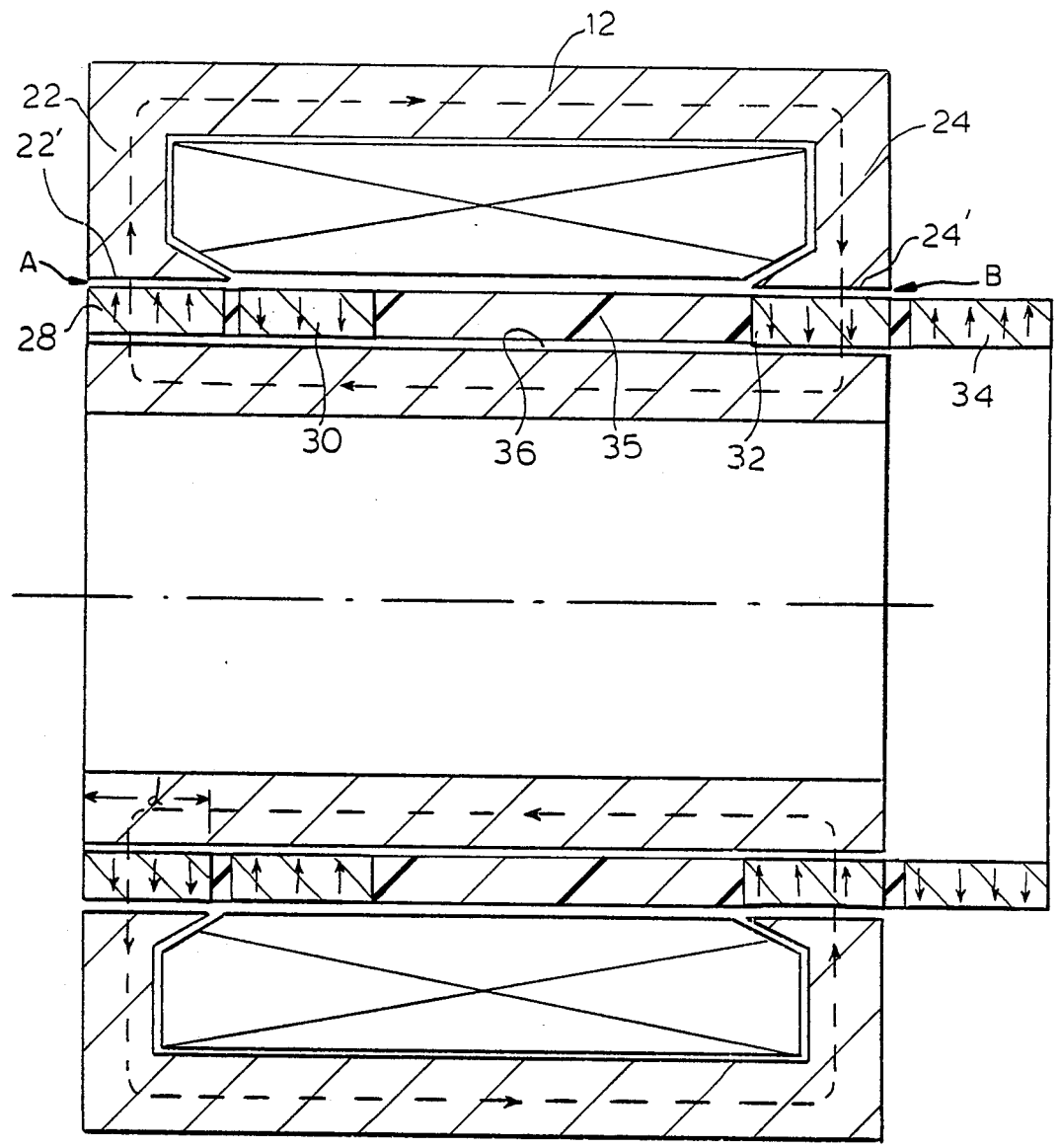
FIG. 3 shows a schematic side view of the machine of FIG. 2 with the plunger in a second extreme position.
Figure 4:
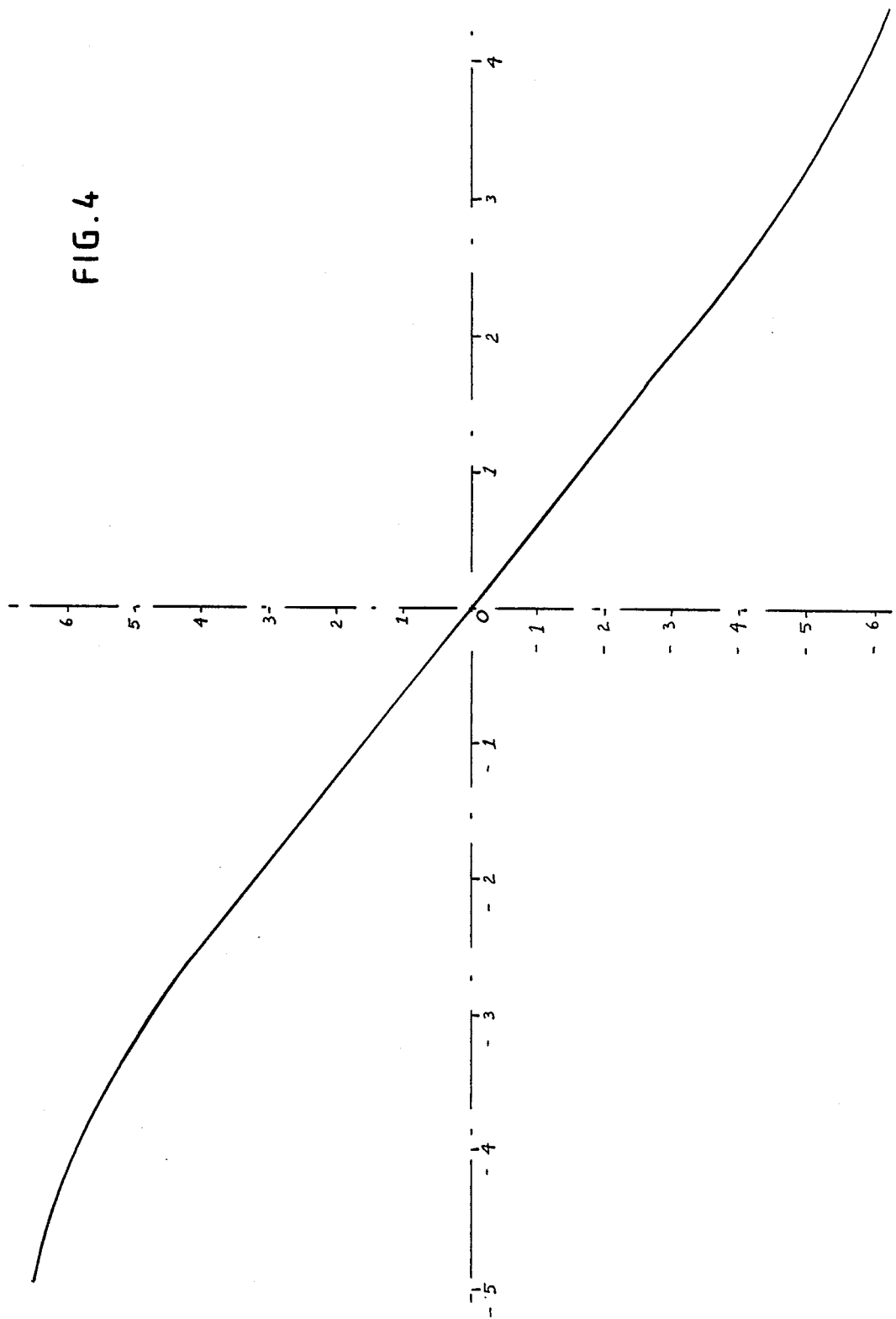
FIG. 4 shows a graph showing the flux in the magnetic circuit with the axial displacement of the plunger.

FIG. 2 shows the plunger 16 in the extreme left position along with the flux paths and with outer ring magnet 34 within the second axial air gap. Note that the flux linking the coil is counterclockwise. FIG. 3 shows the plunger 16 in the extreme right position within the first and air gap A along with the flux paths. In this position, the flux linking the coil is clockwise. Thus, moving the plunger 16 from right to left causes the flux linkages of the coil to change from positive maximum to negative maximum as shown in FIG. 4. When the plunger is reciprocated between the left and right extremes, the flux linkages of the coil also oscillate between the two extreme values. This variation of flux linkages, with respect to time, causes an AC voltage to be induced in the coil. The waveform of the induced voltage is obtained by differentiating this variation of flux linkages with respect to time.

Figure 5:
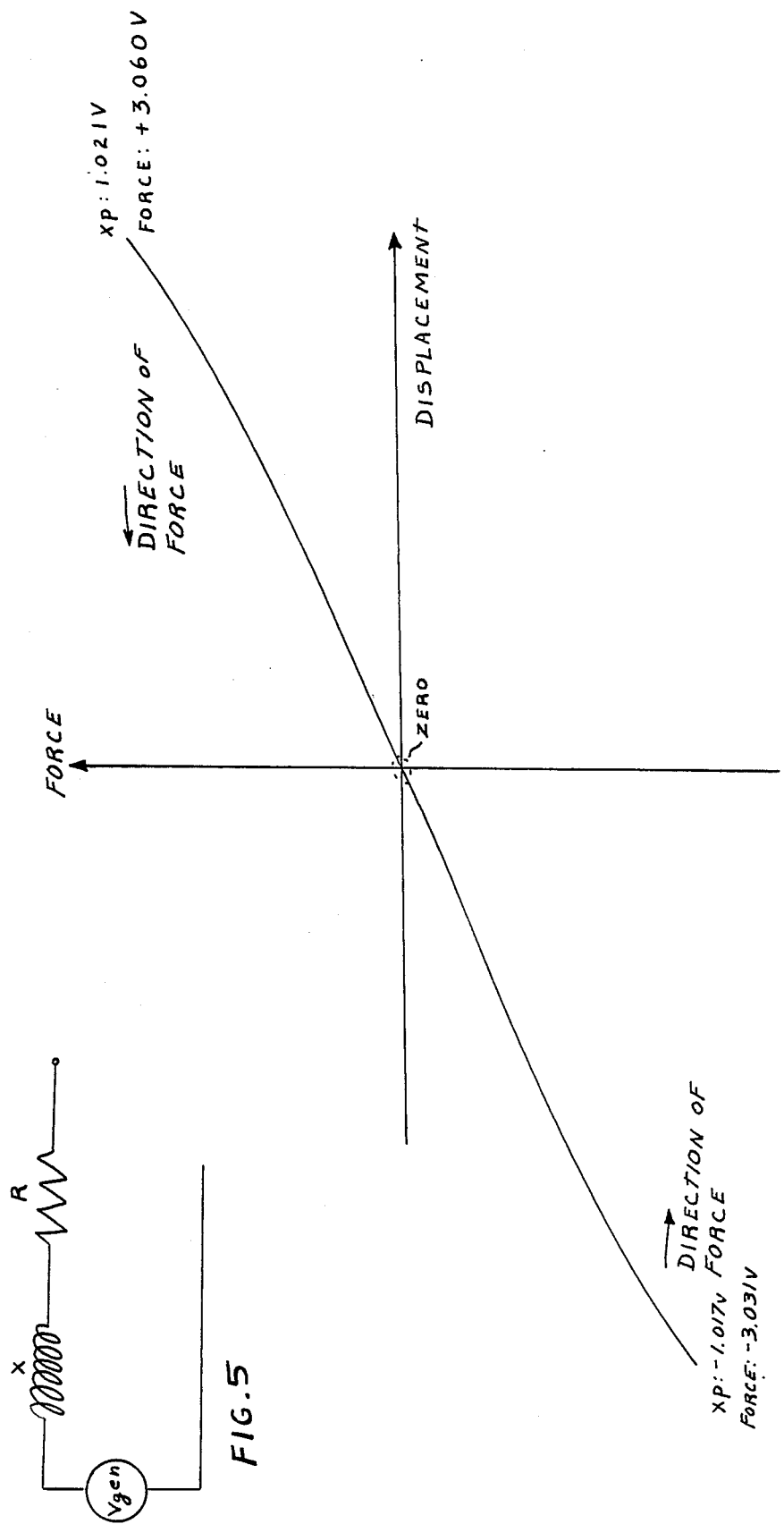
FIG. 5 shows an electrical circuit equivalent to the machine of FIG. 1.

The equivalent circuit of this machine is shown in FIG. 5 and consists of a source of emf in series with the self inductance X and resistance R of the coil. The permanent magnet linear machine of this invention will act as a generator delivering electrical power to the load. That is, the machine converts mechanical input power to electrical output power. Alternatively, if an alternating voltage of the same frequency and of suitable magnitude and phase is applied, current will flow into the coil and convert an electrical power input to a mechanical power output.

Figure 6:
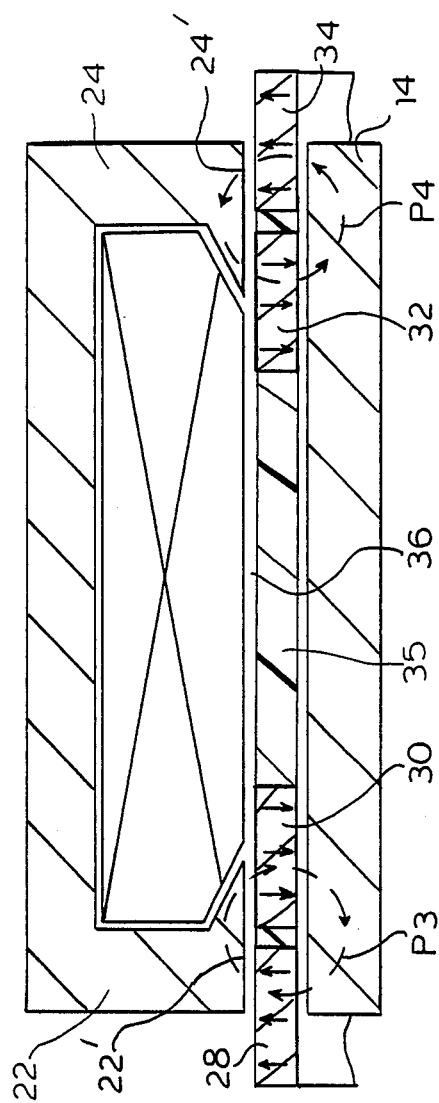
FIG. 6 shows a partial view of the machine of FIG. 2 with the plunger in the central or rest position.

As previously mentioned, it is advantageous to have the plunger in a central position when at rest, i.e. a position half way between the left most and right more positions as indicated in FIG. 6. In this position, pole pieces 22' and 24' cover about half of magnets 28, 30 and 32, 24 respectively as shown. In the absence of external power, a first minor magnetic path $P_3$ is formed between pole piece 22', magnet 30, inner stator 14 and magnet 28. Similarly, a second minor magnetic path $P_4$ is formed between pole piece 24', magnet 32, inner stator 14 and magnet 34. As a result, a centralizing force F is generated which increases with the distance of the plunger from its central position, as shown in FIG. 7. This force F, in the absence of external effects, urges the plunger toward the central position shown in FIG. 6.

Obviously, numerous modifications may be made to the invention without departing from its scope as defined in the appended claims.

What is claimed is:

1. A linear electromagnetic reciprocating machine comprising a stator, first and second axially spaced stator end portions forming pole pieces;

an electric coil operatively disposed with respect to said stator for generating a magnetic field in said stator when excited by an a.c. current;

first means for completing the magnetic path of said stator;

said first means being radially spaced from said first and second stator end portions providing axially spaced first and second gaps;

a plunger, first and second axially spaced outer magnets provided at respective ends of said plunger;

first and second axially spaced inner magnets provided at respective ends of said plunger and axially inwardly of said outer magnets;

said outer magnets being magnetized radially in a first direction, said inner magnets being magnetized radially in a second direction;

a first axial position of said plunger, a second axial position of said plunger, said first outer magnet being within said first gap and opposite said first stator end portion and said second inner magnet being within said second gap and opposite said second stator end portion in said first position of said plunger; and said second outer magnet being within said second gap and opposite said second stator end portion and said first inner magnet being within said first gap and opposite said first stator end portion in said second position of said plunger and wherein said first means for completing the magnetic path of said stator comprises a second stator disposed coaxially within said plunger.

2. The machine of claim 1 wherein said magnets and said end portions have substantially the same axial dimensions.

3. The machine of claim 1 wherein said magnets are made of a high magnetic strength material.

4. The machine of claim 3 wherein said material is samarium cobalt.

5. The machine of claim 4 wherein said magnets are embedded in a non-magnetic material.

6. The machine of claim 1 wherein said stator is radially laminated to eliminate eddy currents.

7. The machine of claim 1 wherein at least one of said inner and outer magnets comprises a plurality of generally rectangular magnetic segments arranged to approximate a ring magnet with radial magnetization.

* * * * *

UNITED STATES PATENT AND TRADEMARK OFFICE
CERTIFICATE OF CORRECTION

PATENT NO. : 4,827,163

DATED : May 02, 1989

INVENTOR(S) : Suresh K. Bhate, et al

It is certified that error appears in the above-identified patent and that said Letters Patent is hereby corrected as shown below:

Column 4, line 50, change "current" to --voltage--.

Signed and Sealed this

Twenty-third Day of October, 1990

Attest:

HARRY F. MANBECK, JR.

*Attesting Officer*    *Commissioner of Patents and Trademarks*

UNITED STATES PATENT AND TRADEMARK OFFICE
CERTIFICATE OF CORRECTION

PATENT NO. : 4,827,163
DATED : May 2, 1989
INVENTOR(S) : Suresh K. Bhate & Nicholas G. Vitale It is certified that error appears in the above-identified patent and that said Letters Patent is hereby corrected as shown below:

Column 4, line 3, before air change the word "and" to --axial--.

Signed and Sealed this

Fifth Day of May, 1992

Attest:

DOUGLAS B. COMER

Attesting Officer

Acting Commissioner of Patents and Trademarks